(12) United States Patent
Choi (10) Patent No.: US 12,539,852 B2
(45) Date of Patent: Feb. 3, 2026

(54) LANE-RELATED ADVANCED DRIVER ASSISTANCE SYSTEM AND CONTROL METHOD THEREOF, AND VEHICLE HAVING THE SAME

(71) Applicant: HL Klemove Corp., Incheon (KR)

(72) Inventor: Jooyoung Choi, Seongnam-si (KR)

(73) Assignee: HL Klemove Corp., Incheon (KR)

( * ) Notice: Subject to any disclaimer, the term of this patent is extended or adjusted under 35 U.S.C. 154(b) by 170 days.

(21) Appl. No.: 18/385,092

(22) Filed: Oct. 30, 2023

(65) Prior Publication Data

US 2025/0002012 A1    Jan. 2, 2025

(30) Foreign Application Priority Data

Jun. 28, 2023 (KR) ........................ 10-2023-0083092

(51) Int. Cl.
| | |
|---|---|
| *B60W 30/12* | (2020.01) |
| *B60Q 1/34* | (2006.01) |
| *B60W 30/18* | (2012.01) |
| *B60W 50/14* | (2020.01) |
| *G06V 20/56* | (2022.01) |

(52) U.S. Cl.
CPC .............. *B60W 30/12* (2013.01); *B60Q 1/346* (2013.01); *B60W 30/18163* (2013.01); *B60W 50/14* (2013.01); *G06V 20/588* (2022.01); *B60W 2420/403* (2013.01); *B60W 2540/00* (2013.01); *B60W 2552/20* (2020.02)

(58) Field of Classification Search
None
See application file for complete search history.

(56) References Cited

U.S. PATENT DOCUMENTS

| | | | |
|---|---|---|---|
| 9,805,275 B2 * | 10/2017 | Okuda ................. | G06V 20/588 |
| 10,640,147 B2 * | 5/2020 | Fu ......................... | G06V 20/588 |
| 10,668,925 B2 * | 6/2020 | Zhu ....................... | B60W 10/20 |
| 11,756,316 B2 * | 9/2023 | Chundrlik, Jr. ........ | G08G 1/167 |
| | | | 382/104 |

* cited by examiner

Primary Examiner — Todd Melton
(74) Attorney, Agent, or Firm — Harvest IP Law, LLP (57) ABSTRACT

The present disclosure relates to a lane-related advanced driver assistance system and a control method, and a vehicle having the same. A system according to an embodiment of the present disclosure may include a memory for storing an image captured by a camera of a vehicle; and a processor for controlling a lane-related Advanced Driver Assistance System (ADAS) in the vehicle using information stored in the memory, wherein the processor is configured to: identify a driver's intention in a rear region of a target section, which is a divergence point section without an indication line, using the image; and determine whether to perform the lane-related ADAS function in the target section according to the identified driver's intention.

20 Claims, 5 Drawing Sheets

LANE-RELATED ADVANCED DRIVER ASSISTANCE SYSTEM AND CONTROL METHOD THEREOF, AND VEHICLE HAVING THE SAME

CROSS-REFERENCE TO RELATED APPLICATION

This application claims priority to and the benefit of Korean Patent Application No. 10-2023-0083092, filed on Jun. 28, 2023, the disclosures of which is incorporated herein by reference in its entirety.

FIELD

The present disclosure relates to an Advanced Driver Assistance System (ADAS) technology applied to a vehicle, and more particularly, to a technology that improves a malfunction occurring in an ADAS related to a lane of a vehicle, such as a Lane Keeping System (LKS) or a Lane Departure Warning System (LDWS) (hereinafter, referred to as a "lane-related ADAS"), if the vehicle enters a vicinity of a lane-free divergence point section.

BACKGROUND

Recently, autonomous vehicles have been actively developed. In such autonomous vehicles, the vehicle autonomously performs various motions previously determined and performed by humans. In addition, even if the vehicle is not the autonomous vehicles, an ADAS that assists a driver to safely and conveniently drive the vehicle has been developed and applied to the vehicle. Of course, ADAS is also applied to autonomous vehicles as needed.

Among these various ADAS, there are lane-related ADAS that perform various supports related to lane maintenance or deviation of the vehicles. That is, the lane-related ADAS performs various controls related to the lane on which the vehicle is driving (hereinafter, referred to as a "driving lane"). That is, the lane-related ADAS may control the vehicle to maintain the driving lane or generate a warning when the vehicle deviates from the driving lane. For example, the lane-related ADAS may include LKS or LDWS.

At this time, the LKS is an ADAS technology, also referred to as a Lane Keeping Control System (LKCS) or a Lane Keeping Assist System (LKAS). That is, the LKS is an ADAS that recognizes the driving lane on which the vehicle is driving using a camera mounted on the vehicle and then controls the vehicle to maintain the driving lane without deviating from the driving lane. The LDWS is an ADAS that recognizes the driving lane using a forward camera mounted on the vehicle and then controls to generate a warning when the vehicle leaves the driving lane without the driver's intention to change lanes (e.g., operation of a turn signal light, etc.).

Figure 1:
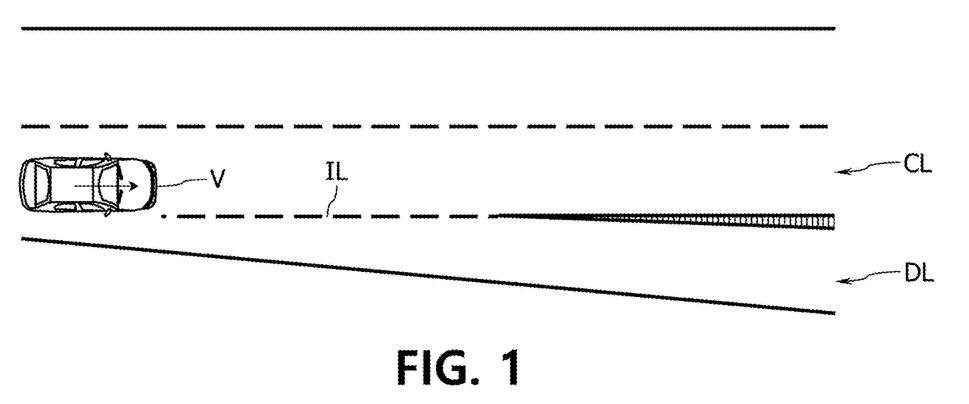
FIG. 1 shows an example of a state in which the vehicle V enters the vicinity of a lane-present divergence point section.
Figure 2:
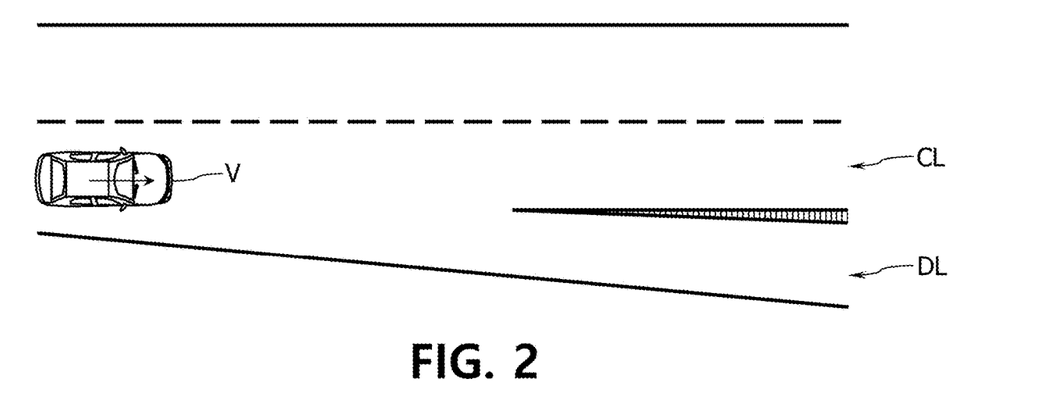
FIG. 2 shows an example of a state in which the vehicle V enters the vicinity of a lane-free divergence point section.

FIG. 1 shows an example of a state in which the vehicle V enters the vicinity of a lane-present divergence point section, and FIG. 2 shows an example of a state in which the vehicle V enters the vicinity of a lane-free divergence point section.

Meanwhile, referring to FIGS. 1 and 2, there is a divergence point section in which a diverging lane DL, which is a lane branched from a lane located on the leftmost side (i.e., a primary lane) or a lane located on the rightmost side, is generated while the vehicle is driving. Hereinafter, these first and rightmost lanes are referred to as "edge lanes".

In general, when such a divergence point section is present in front, as shown in FIG. 1, an indication line IL, such as a dotted line following from the diverging lane DL is displayed on a road in the vicinity of the corresponding divergence point section (i.e., a portion before entering the corresponding divergence point section).

However, in some cases, as shown in FIG. 2, there may be a lane-free divergence point section. Hereinafter, the divergence point section without the lane is referred to as a "target section". In a case where the vehicle V tries to enter the vicinity of the target section, since the indication line IL is not displayed on the road, if there is no separate lane change intention operation (e.g., operation of a turn signal lamp, etc.) by the driver, operation of the lane-related ADAS such as the LKS or LDWS is performed based on information on the lane of the recognized current driving lane.

In this case, despite a situation in which the driver actually needs to change the lane, there is a problem (hereinafter, referred to as "first problem") in that a lane maintenance control and a lane departure warning are malfunctioned by the lane-related ADAS.

For example, in the situation shown in FIG. 2, if the vehicle V is to perform a lane change to enter the diverging lane DL in a state where there is no operation of right turn signal lamp by the driver, the lane maintenance control for an edge lane CL of a secondary lane may be generated by the LKS. Alternatively, in the above case, a warning may be generated by the LDWS. Such lane maintenance control or warning corresponds to unnecessary control that is provided against the driver's intention.

In addition, as the driver tries to change the lane without operating the turn signal lamp in the corresponding situation, it is difficult to predict a lane change of the host vehicle V in a vehicle following the host vehicle V (hereinafter, referred to as "following vehicle"). Accordingly, there is a problem (hereinafter, referred to as "second problem") in which the risk of an accident between the host vehicle V and the following vehicle increases.

However, the above information merely provides background information on the present disclosure and does not correspond to previously disclosed technologies.

SUMMARY

In order to solve the above problems of the prior art, the present disclosure provides a technology for improving a malfunction occurring in a lane-related ADAS when a vehicle enters the vicinity of a target section.

That is, the present disclosure provides a technology for recognizing a driver's intention in the vicinity of a target section and controlling the driver to perform or not perform a function of a lane-related ADAS as necessary.

Further, the present disclosure provides a technology for reducing the risk of an accident with a following vehicle by controlling the lane-related ADAS function to be performed or not performed according to the driver's intention identified in the vicinity of the target section and simultaneously controlling a turn signal lamp to operate according to the control.

However, the technical problems to be solved by the present disclosure are not limited to the above-mentioned technical problems, and other technical problems not mentioned may be clearly understood by those skilled in the art from the following description.

A system according to an embodiment of the present disclosure for solving the above problems may include a memory for storing an image captured by a camera of a vehicle; and a processor for controlling a lane-related Advanced Driver Assistance System (ADAS) in the vehicle using information stored in the memory, wherein the processor is configured to: identify a driver's intention in a rear region of a target section, which is a divergence point section without an indication line, using the image; and determine whether to perform the lane-related ADAS function in the target section according to the identified driver's intention.

In the system according to one embodiment of the present disclosure, the lane-related ADAS may include a Lane Keeping System (LKS) or a Lane Departure Warning System (LDWS).

In the system according to one embodiment of the present disclosure, the processor may identify the driver's intention using a first change rate, which is a rate of change in a width of a driving lane in a rear region of a target section, and a second change rate, which is a rate of change in a distance of the vehicle to a lane located in an edge direction of the driving lane in the rear region of the target section, in a state where there is no operation of a turn signal lamp.

In the system according to one embodiment of the present disclosure, the processor may identify the first and second rates of change using the images captured at different times in the rear region.

In the system according to one embodiment of the present disclosure, the processor may identify that the driver's intention is a first intention to enter a connection edge lane, which is a lane connected to the driving lane, if the first and second change rates both increase.

In the system according to one embodiment of the present disclosure, the processor may control the lane-related ADAS function to be activated based on the connection edge lane in the target section if the first intention is identified.

In the system according to one embodiment of the present disclosure, the processor may control the vehicle to maintain the connection edge lane according to the activation or to generate a warning if the vehicle deviates from the connection edge lane.

In the system according to one embodiment of the present disclosure, the processor may control the turn signal lamp for the direction of the connection edge lane to operate upon the activation.

In the system according to one embodiment of the present disclosure, the processor may identify that the driver's intention is a second intention to enter a diverging lane branched from the driving lane if the first change rate increases and the second change rate decreases.

In the system according to one embodiment of the present disclosure, the processor may control the lane-related ADAS function to be deactivated in the target section if the second intention is identified.

In the system according to one embodiment of the present disclosure, the processor may control the turn signal lamp for the direction of the diverging lane to operate upon the deactivation.

A control method according to an embodiment of the present disclosure is a control method performed in a system of a vehicle for controlling a lane-related Advanced Driver Assistance System (ADAS) using an image captured by a camera of the vehicle, the control method may include identifying a driver's intention in a rear region of a target section, which is a divergence point section without an indication line, using the image; and determining and controlling whether to perform the lane-related ADAS function in the target section according to the identified driver's intention.

In the control method according to one embodiment of the present disclosure, the identifying may include identifying the driver's intention using a first change rate, which is a rate of change in a width of a driving lane in a rear region of a target section, and a second change rate, which is a rate of change in a distance of the vehicle to a lane located in an edge direction of the driving lane in the rear region of the target section, in a state where there is no operation of a turn signal lamp.

In the control method according to one embodiment of the present disclosure, the identifying may include identifying the first and second rates of change using the images captured at different times in the rear region.

In the control method according to one embodiment of the present disclosure, the identifying may include identifying that the driver's intention is a first intention to enter a connection edge lane, which is a lane connected to the driving lane, if the first and second change rates both increase, and identifying that the driver's intention is a second intention to enter a diverging lane branched from the driving lane if the first change rate increases and the second change rate decreases.

In the control method according to one embodiment of the present disclosure, the controlling may include controlling the lane-related ADAS function to be activated based on the connection edge lane in the target section if the first intention is identified.

In the control method according to one embodiment of the present disclosure, the controlling may include controlling the vehicle to maintain the connection edge lane according to the activation or to generate a warning if the vehicle deviates from the connection edge lane.

In the control method according to one embodiment of the present disclosure, the controlling may include controlling the lane-related ADAS function to be deactivated in the target section if the second intention is identified.

In the control method according to one embodiment of the present disclosure, the method may further include controlling the turn signal lamp for the direction of the connection edge lane to operate upon the activation, and controlling the turn signal lamp for the direction of the diverging lane to operate upon the deactivation.

The vehicle according to an embodiment of the present disclosure may include a camera for capturing an image of a front of the vehicle; and a controller for performing control of a lane-related Advanced Driver Assistance System (ADAS) using the image, wherein the controller is configured to identify a driver's intention in a rear region of a target section, which is a divergence point section without an indication line, using the image; and determine whether to perform the lane-related ADAS function in the target section according to the identified driver's intention.

The present disclosure configured as described above has an advantage of improving malfunction occurring in a lane-related ADAS by recognizing the driver's intention near a target section and controlling the driver to perform or not perform a function of a lane-related ADAS as necessary when the vehicle enters the vicinity of the target section.

Further, the present disclosure may control to perform or not perform the function of the lane-related ADAS according to the driver's intention identified in the vicinity of the target section, and may simultaneously control the turn signal lamp to operate according to the control, thereby reducing the risk of an accident with a following vehicle.

The effects that can be obtained by the present disclosure are not limited to the above-described effects, and other

DETAILED DESCRIPTION OF EXEMPLARY EMBODIMENTS

The above objects, means and advantages of the present disclosure will become more apparent from the following detailed description of the accompanying drawings, and accordingly, it will be easily understood by those skilled in the art to which the present disclosure pertains. In addition, in the description of the present disclosure, a detailed description of known techniques related to the present disclosure will be omitted when it is determined that the subject matter of the present disclosure may be unnecessarily obscured.

The terminology used herein is for the purpose of describing embodiments and is not intended to limit the present disclosure. In this specification, singular forms "a", "an", and "the" also include plural forms in some cases unless otherwise specified in the text. In the specification, the terms "include", "comprise", "contain", and "have" do not exclude the presence or addition of one or more other components other than the mentioned components.

In the specification, the terms "or", "at least one", and the like may indicate one of the words listed together, or may indicate a combination of two or more. For example, "A or B", "at least one of A and B" may include only one of A or B, and may include both A and B.

In the specification, the description according to "for example", etc., should not be limited to embodiments of the present disclosure according to various embodiments of the present disclosure to effects such as variations including tolerances, measurement errors, limitations of measurement accuracy, and other commonly known factors, such that the presented information such as the recited characteristics, variables, or values may not be exactly consistent.

In the specification, when an element is described as being "connected to" or "coupled to" another element, it should be understood that the element may be directly connected to or coupled to the other element, but other elements may be present in the middle. On the other hand, when an element is described as being "directly connected to" or "directly coupled to" another element, it should be understood that there are no intervening elements.

In the specification, when an element is described as being "on" or "adjacent to" another element, it should be understood that the element may be directly engaged or coupled to the other element, but other elements may be present in the middle. On the other hand, when an element is described as being "directly on" or "directly adjacent to" another element, it should be understood that there are no intervening elements. Other expressions describing a relationship between elements, for example, "between" and "directly between" may be interpreted as well.

In the present specification, terms such as "first", "second" may be used to describe various elements, but the corresponding elements should not be limited by the above terms. Further, the above terms should not be interpreted as limiting the order of each element, but may be used for the purpose of distinguishing between one element and another. For example, the "first element" may be referred to as a "second element", and similarly, the "second element" may be referred to as a "first element".

Unless otherwise defined, all terms used in the specification may be used in their meanings that can be commonly understood by those skilled in the art to which the present disclosure pertains. Further, terms defined in a commonly used dictionary are not interpreted ideally or excessively unless otherwise clearly defined.

Hereinafter, a preferred embodiment according to the present disclosure will be described in detail with reference to the accompanying drawings.

However, hereinafter, "divergence point section" refers to a road section where a diverging lane DL occurs or before the corresponding diverging lane DL occurs. Further, as shown in FIG. 1, "lane-present divergence point section" refers to a divergence point section in which an indication line IL is displayed on a bottom surface of an edge lane before the diverging lane DL is branched. In this case, the indication line IL is a dotted line or the like displayed on the bottom surface of the lane to extend from the future diverging lane DL to the edge lane. This indication line IL corresponds to a mark for distinguishing the corresponding diverging lane DL. On the other hand, "lane-free divergence point section" (i.e., target section) refers to a divergence point section in which an indication line IL is not displayed on a bottom surface of an edge lane before the diverging lane DL is branched, as shown in FIG. 2.

Figure 3:
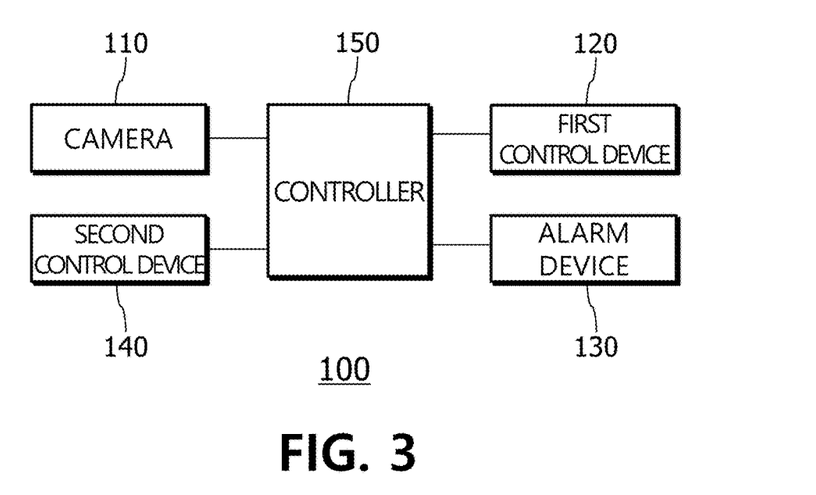
FIG. 3 shows a schematic block diagram of a system according to an embodiment of the present disclosure.

FIG. 3 shows a schematic block diagram of a system according to an embodiment of the present disclosure.

The system 110 (hereinafter, referred to as "the present system") according to an embodiment of the present disclosure is an Advanced Driver Assistance System (ADAS) related to a lane. The present system 110 recognizes a driving lane of a vehicle V in a real-time image of a front or rear of the vehicle V, and provides an ADAS function related to the recognized driving lane. For example, the present system 110 may include a Lane Keeping System (LKS), a Lane Departure Warning System (LDWS), or the like. Of course, the present system 110 may include both the LKS and the LDWS.

The present system 110 includes a camera 110 and a controller 150, as shown in FIG. 3. The present system 110 may further include at least one of a first control device 120, an alarm device 130, and a second control device 140. At this time, the first control device 120 is provided to perform the lane-related ADAS function of the LKS, and the alarm device 130 is provided to perform the lane-related ADAS function of the LDWS. In addition, the second control device 140 is provided for a control function for a turn signal lamp.

Figure 4:
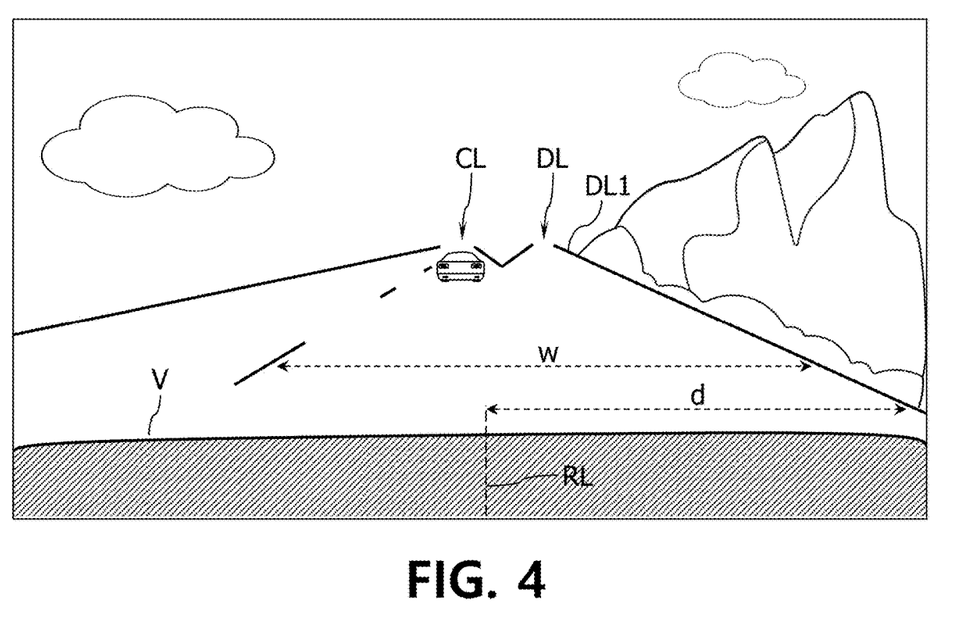
FIG. 4 shows an example of a front image captured by the camera of the vehicle V when the vehicle V enters the vicinity of a lane-free divergence point section.

FIG. 4 shows an example of a front image captured by the camera 110 of the vehicle V when the vehicle V enters the vicinity of a lane-free divergence point section.

The camera 110 captures a front image of the vehicle V being driven, and the captured front image is transmitted to the controller 150. In this case, an image of the driving lane of the vehicle V is included in the image. Of course, the camera 110 may additionally capture a rear image, and in this case, the captured rear image may be transmitted to the controller 150. Naturally, when simultaneously photographing the front and rear images, a plurality of cameras 110 are provided in the vehicle V.

For example, when the vehicle V traveling on the edge lane enters the vicinity of the target section, as shown in FIG. 4, only the diverging lane DL is displayed in the front image without the indication line IL. In this case, the vehicle V may enter a lane connected in a straight direction from an edge lane on which the vehicle V was traveling (i.e., corresponds to a lane next to the diverging lane DL, and corresponds to a secondary lane in FIG. 4) (hereinafter, referred to as "connection edge lane CL") (hereinafter, such a situation is referred to as "first situation"). Alternatively, the vehicle V may enter the diverging lane DL from the edge lane on which the vehicle V was traveling (hereinafter, such a situation is referred to as "second situation").

The first control device 120 is a device for controlling the steering of the vehicle V, and is involved in the lane-related ADAS function of the LKS according to a control signal of the controller 150.

That is, the LKS is an ADAS that recognizes a driving lane of the vehicle V using the front or rear image captured by the camera 110 and then controls the vehicle V to maintain the recognized driving lane without deviating. At this time, the first control device 120 controls the degree of steering of the vehicle V according to the control signal of the controller 150.

For example, the control signal for a steering value for maintaining the driving lane recognized based on the front or rear image may be transmitted from the controller 150 to the first control device 120. In this case, the first control device 120 may perform steering control reflecting the steering value according to the corresponding control signal. The first control device 120 may be referred to as a "steering control device" differently.

The warning device 130 is a device that generates a warning in the vehicle V and is involved in the lane-related ADAS function of the LDWS according to the control signal of the controller 150.

That is, the LDWS is an ADAS that recognizes a driving lane of the vehicle V using the front or rear image captured by the camera 110 and then controls the vehicle V to generate the warning when the vehicle V leaves the corresponding driving lane without a driver's lane change intention operation (for example, operation of a turn signal lamp, etc.). In this case, the alarm device 130 generates the warning according to the control signal of the controller 150.

For example, the control signal may be transmitted from the controller 150 to the alarm device 130 when the vehicle V deviates from the driving lane recognized based on the front or rear image in a state in which the driver does not intend to change the lane. In this case, the alarm device 130 may generate the warning according to the corresponding control signal.

In particular, after the vehicle V enters the vicinity of the target section, the first situation may occur in a state in which there is no volitional action to change lanes (e.g., operation of a turn signal lamp, etc.). In this case, the connection edge lane CL is recognized as the driving lane of the vehicle, and the lane-related ADAS function of the LKS or LDWS is performed based on the corresponding connection edge lane CL included in the image of the camera 110. That is, the LKS function is performed so that the vehicle V maintains the connection edge lane CL without leaving the CL, or the LDWS function is performed so that the warning is generated when the vehicle V leaves the connection edge lane CL.

On the other hand, after the vehicle V enters the vicinity of the target section, the second situation may occur in a state in which there is no volitional action to change lanes (e.g., operation of a turn signal lamp, etc.). This second situation corresponds to a case in which the steering wheel of the vehicle V is manipulated by the driver according to the driver's intention. However, in this case, in the prior art, the lane-related ADAS function of the LKS or LDWS is activated to travel on the connection edge lane, thereby causing the first problem of hindering the driver's intention to change the lane. To improve this first problem, the lane-related ADAS function of the LKS or LDWS is deactivated in the second situation. That is, in the second situation, the first control device 120 does not perform steering control for maintaining the connection edge lane CL. In addition, the alarm device 130 does not generate the warning even if the vehicle V deviates from the connection edge lane CL and enters the diverging lane DL. Accordingly, the change of the lane of the vehicle V may be smoother in the vicinity of the target section.

The second control device 140 is a device for controlling the operation of the turn signal lamp, and controls on/off of the turn signal lamp of the vehicle V according to the control signal of the controller 150 generated in the vicinity of the target section. That is, the second control device 140 may control at least one of the turn signal lamps on both sides (right and left) to be operated or both turn signal lamps to be inoperative according to the control signal of the controller 150 generated when the vehicle V enters the vicinity of the target section.

For example, when the second situation occurs, as described above, the lane-related ADAS function of the LKS or LDWS may be deactivated, and a control signal for notifying the following vehicle of the entry direction of the vehicle V entering the diverging lane DL may be transmitted from the controller 150 to the second control device 140. In this case, the second control device 140 performs control to operate the turn signal lamp according to the corresponding control signal. The second control device 140 may be referred to as a "turn signal lamp control device" differently.

The controller 150 controls ADAS functions related to a lane. That is, the controller 150 controls to recognize the driving lane of the vehicle V from the front or rear image captured from the camera 110, and controls to provide an ADAS function related to the recognized driving lane. That is, the controller 150 may control the operations of the first control device 120, the alarm device 130, and the second control device 140 according to the recognized driving lane.

This controller 150 may include a processor and a memory, and may be referred to differently as an electronic control unit (ECU). At this time, the processor may process a lane-related ADAS function, and the memory may store programs and various data for the operation of the processor. For example, the memory may store data on an image captured by the camera 100 and data on a program related to a control method to be described later. At this time, the processor controls the lane-related ADAS function according to a control method to be described later using the information stored in the memory.

For example, the processor may include a microprocessor, a central processing unit (CPU), a processor core, a multi-processor, an application-specific integrated circuit (ASIC), a field programmable gate array (FPGA), and the like, but is not limited thereto.

For example, the memory may include a volatile memory such as a DRAM or an SRAM, a non-volatile memory such as a PROM, an MRAM, an EPROM, a ROM, an EPROM, a flash memory, a hard disk drive (HDD), a solid state drive (SSD) or the like, but is not limited thereto.

Figure 5:
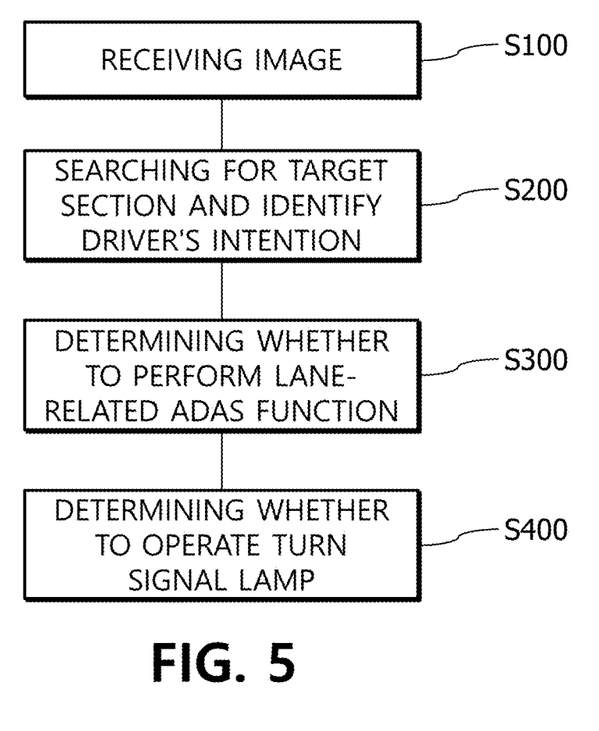
FIG. 5 shows a flowchart of a control method according to an embodiment of the present disclosure.

FIG. 5 shows a flowchart of a control method according to an embodiment of the present disclosure.

Referring to FIG. 5, the control method according to an embodiment of the present disclosure is a method performed by the controller 150 to control the operation of the system 110 described above, and includes Step 100 to Step 400. These Step 100 to Step 400 may be sequentially performed, but the present disclosure is not limited thereto. For example, the order of Step 300 and Step 400 may be performed in the reverse order, or the order of S300 and S400 may be performed simultaneously, unlike the order shown in FIG. 5. However, in the following description, the control functions of the controller 150 according to Step 100 to Step 400 may correspond to a function that the processor performs using the information stored in the memory. That is, Step 100 to Step 400 may be stored in the memory of the controller 150 and may be controlled by the processor.

In Step 100, the controller 150 receives an image captured by the camera 100. In this case, the camera 100 captures a front or rear image of the vehicle V being driven, and the captured front or rear image is transmitted to the controller 150. At this time, an image of the driving lane of the vehicle V is included in the front or rear image captured by the camera 100. In particular, when the vehicle V enters the vicinity of the target section, images of the divergence point and the diverging lane DL are included in the front or rear image captured by the camera 100.

Of course, in Step 100, the controller 150 may additionally receive navigation information and the like in addition to the image of the camera 100.

In Step 200, the controller 150 controls the vehicle V to search for the target section using the image received in Step 100. That is, the controller 150 searches within the corresponding image whether a divergence point section in which the driving lane is branched into the diverging lane DL and the connection edge lane CL occurs while the vehicle V is driving the edge lane. In particular, the controller 150 searches for whether a divergence point section (i.e., a target section) without the indication line IL occurs in the corresponding image. Of course, the controller 150 may analyze the image of the camera 100 to determine whether the vehicle V has entered the vicinity of the searched target section.

In addition, in Step 200, the controller 150 also determines the driver's intention in the vicinity of the searched target section. That is, when the vehicle V enters the vicinity of the searched target section, the controller 150 determines whether the driver is intended to enter the connection edge lane CL in the future (hereinafter, referred to as a "first intention") or the diverging lane DL (hereinafter, referred to as a "second intention"). At this time, the first intention indicates an intention that the driver maintains the current driving lane and enters the connection edge lane CL. Also, the second intention indicates an intention that the driver changes the current driving lane and then enters the diverging lane DL.

In particular, the controller 150 may identify the first or second intention depending on a rate of change in a width of a driving lane (hereinafter, referred to as a "first change rate") or a rate of change in a distance of the vehicle V with respect to the driving lane (hereinafter, referred to as a "second change rate").

Figure 6:
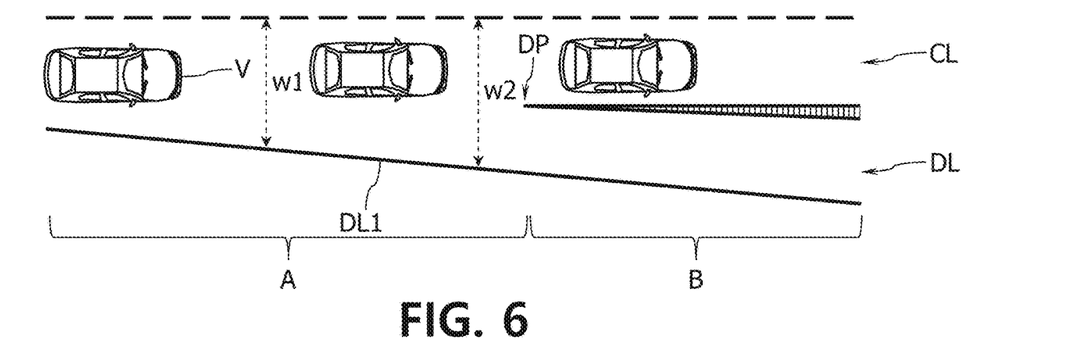
FIG. 6 shows a process in which a vehicle V enters a connection edge lane CL in the vicinity of a lane-free divergence point section.
Figure 7:
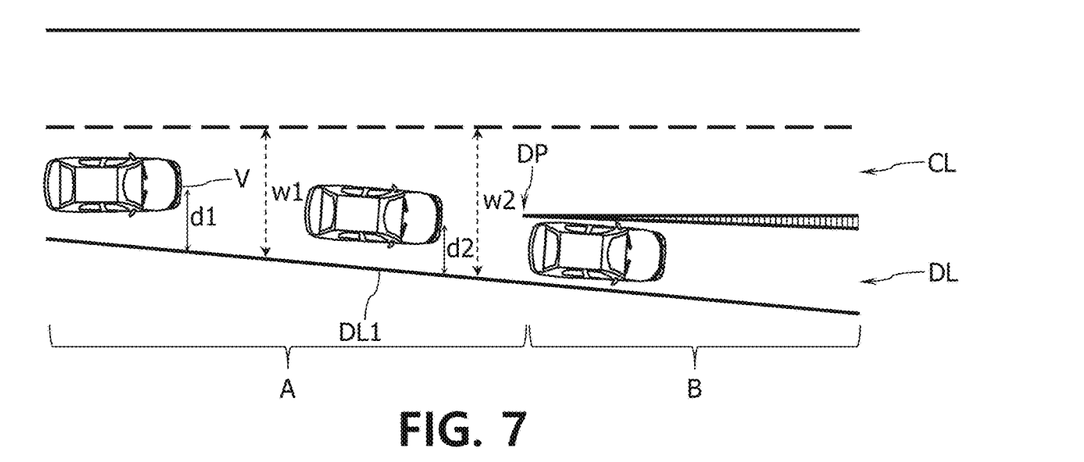
FIG. 7 shows a process in which a vehicle V enters a diverging lane DL in the vicinity of a lane-free divergence point section.

FIG. 6 shows a process in which a vehicle V enters a connection edge lane CL in the vicinity of a lane-free divergence point section, FIG. 7 shows a process in which a vehicle V enters a diverging lane DL in the vicinity of a lane-free divergence point section.

Referring to FIGS. 6 and 7, the vicinity of the target section includes a rear area A and a front area B with respect to the divergence point DP. That is, the rear area A is an area where the vehicle V first arrives and corresponds to a previous area based on the divergence point DP. Also, the front area B is an area where the vehicle V arrives after the rear area B, and corresponds to a later area based on the divergence point DP.

In this case, the first change rate indicates the degree of change in the width w of the driving lane in the rear area A in the vicinity of the target section. That is, the change degree of the width w that changes depending on the driving time of the vehicle V is the first change rate.

In particular, referring to FIGS. 6 and 7, since w2>w1 is obtained in the rear area A near the target section, the rate of change in the width of the driving lane gradually increases as the vehicle V travels. In this case, w1 is the width w of the driving lane identified from an image of the camera 100 captured at a first time t1 for the vehicle V reaching the rear area A near the target section. In addition, w2 is the width w of the driving lane identified from the image of the camera 100 captured at a second time t2 (i.e., t2>t1) after the first time t1 for the vehicle V reaching the rear area A near the target section.

In addition, the second change rate indicates the degree of change in the distance d of the vehicle V to the lane (right lane in FIG. 4, lower lane in FIG. 7) (hereinafter referred to as "DLI") located in a direction of the diverging lane DL (i.e., edge direction) among driving lanes in a rear area A near the target section. That is, the change degree of the distance d, which is changed according to the driving time of the vehicle V, is the second change rate. In this case, referring to FIG. 4, the distance d represents a distance between a reference line RL of the vehicle V recognized from the image of the camera 100 and DLI recognized in the corresponding image. The reference line RL may be a specific line indicating a position of the vehicle V recognized in the image of the camera 100, and may correspond to a line indicating a center position of the vehicle V, but is not limited thereto.

In particular, referring to FIG. 7, when the vehicle V is to enter the diverging lane DL according to the second intention, since d1>d2 is set in the rear area A near the target section, the distance change rate of the vehicle V to the driving lane gradually decreases as the vehicle V travels. In this case, d1 is a distance d between the RL and DLI recognized in an image of the camera 100 captured at first time t1 with respect to the vehicle V reaching the rear area A near the target section. In addition, d2 is a distance d between the RL and DLI recognized in an image of the camera 100 captured at second time t2 (i.e., t2>t1) after the first time t1 with respect to the vehicle V reaching the rear area A near the target section.

The first and second change rates may be identified using an image of the camera 100. In other words, the controller 150 may identify the first and second change rates using images of the camera 100 captured at different times (e.g., t1 and t2) in the rear area A near the target section. However, the first change rate may be determined by using the navigation information received in Step 100 together in addition to the image of the camera 100.

For example, if the first change rate increases as the second change rate increases as the vehicle V travels in the image of the camera 100 over time, and after the vehicle V enters the rear area A near the target section, in a state where there is no operation of the turn signal lamp, the controller 150 may identify that the driver has the first intention. On the other hand, if the first change rate increases and the second change rate decreases as the vehicle V travels in the image of the camera 100 over time, and after the vehicle V enters the rear area A near the target section, in a state where there is no operation of the turn signal lamp, the controller 150 may identify that the driver has the second intention.

In addition, the controller 150 may identify the first or second intention according to the operation of the steering wheel, the operation of the turn signal lamp, or the operation of the emergency lamp applied by the driver.

For example, after the vehicle V enters the rear area A near the target section, in a state where there is no operation of the turn signal lamp, if operation of the steering wheel to enter the connecting edge lane CL is applied (hereinafter, referred to as a "first operation"), the controller 150 may identify that the driver has the first intention. The first operation may be a cause of a case in which the first change rate increases and the second change rate increases as the vehicle V travels in the image of the camera 100. However, the controller 150 may determine whether the driver has the first intention by considering the first operation and the first and second change rates together.

On the other hand, after the vehicle V enters the rear area A near the target section, in a state where there is no operation of the turn signal lamp, if operation of the steering wheel to enter the diverging lane DL is applied (when operated in the right direction in FIG. 4) (hereinafter, referred to as a "second operation"), the controller 150 may identify that the driver has the second intention. The second operation may be a cause of a case in which the first change rate increases and the second change rate decreases as the vehicle V travels in the image of the camera 100. However, the controller 150 may determine whether the driver has the second intention by considering the second operation and the first and second change rates together.

Further, after the vehicle V enters the rear area A near the target section and then operation of the turn signal lamp directed to the connection edge lane CL is applied (when the left turn signal lamp is operated in FIG. 4) (hereinafter, referred to as a "third operation"), the controller 150 may identify that the driver has the first intention.

On the other hand, after the vehicle V enters the rear area A near the target section and then operation of the turn signal lamp directed to the diverging lane DL is applied (if the right turn signal lamp is operated in FIG. 4 and is operated in the direction) (hereinafter referred to as a "fourth operation"), or if operation of the emergency lamp is applied (hereinafter referred to as a "fifth operation"), the controller 150 may determine that the driver has the second intention.

However, if the first to fourth operations indicate different directions, the first and second operations take precedence over the third and fourth operations, so that the first or second intention may be identified. That is, if the first and fourth operations are generated together, the controller 150 may identify that the driver has the first intention while the first operation is considered as a priority. Further, if the second and third operations are generated together, the controller 150 may identify that the driver has the second intention while the second operation is considered as a priority.

In Step 300, the controller 150 determines whether to perform a lane-related ADAS function in the vicinity of the target section according to the identified driver's intention. That is, the first situation or the second situation occurs according to the identified driver's intention.

For example, if it is determined that the driver has the first intention in the vicinity of the target section, the controller 150 may control the lane-related ADAS function to be activated, thereby causing a first situation. At this time, the controller 150 recognizes that the connection edge lane CL is a driving lane of the vehicle, and controls the lane-related ADAS function of the LKS or LDWS to be performed based on the corresponding connection edge lane CL included in the image of the camera 110. That is, the controller 150 may control the LKS function to be performed by transmitting a control signal to the first control device 120 so that the vehicle V maintains the connection edge lane CL without deviating from it. Further, the controller 150 may transmit a control signal to the alarm device 130 to generate a warning if the vehicle V leaves the connection edge lane CL, thereby controlling the LDWS function to be performed.

On the other hand, if it is determined that the driver has a second intention in the vicinity of the target section, the controller 150 controls the lane-related ADAS function to be deactivated, thereby causing a second situation. In this case, the controller 150 may control the first controller 150 not to perform steering control for maintaining the connection edge lane CL. Further, the controller 150 may control the alarm device 130 not to generate a warning even if the vehicle V deviates from the connection edge lane CL and enters the diverging lane DL.

In particular, whether the above-described lane-related ADAS function is performed in Step 300 may be more effective if there is no operation of the turn signal lamp according to the third or fourth operation in Step 200. That is, after the vehicle V enters the vicinity of the target section, in a state where there is no operation of the turn signal lamp, the first or second intention of the driver is identified according to the steering wheel operation according to the first or second operation, and whether the lane-related ADAS function of the LKS or the LDWS is determined according to the identified intention, so that the above-described first problem of the prior art can be easily solved.

In Step 400, the controller 150 determines whether to operate the turn signal lamp. That is, if the lane-related ADAS function is deactivated in Step 300, the controller 150 may transmit a control signal for informing a following vehicle of the entry direction of the host vehicle V to enter the diverging lane DL to the second control device 140. Of course, if the lane-related ADAS function is activated in Step 300, the controller 150 may transmit a control signal for informing a following vehicle of the entry direction of the host vehicle V to enter the connection edge lane CL to the second control device 140. Accordingly, the second control device 140 performs control to operate the turn signal lamp according to the corresponding control signal.

For example, in a situation in which the second intention is identified in Step 200 and the lane-related ADAS function is deactivated in Step 300, if the edge lane and the diverging lane DL are located on the right side with respect to the traveling direction of the vehicle V, the vehicle V tries to enter the diverging lane DL on the right side, so the controller 150 may transmit a control signal for operating the right turn signal lamp to the second control device 140. In addition, in a situation in which the second intention is identified in Step 200 and the lane-related ADAS function is deactivated in Step 300, if the edge lane and the diverging lane DL are located on the left side with respect to the traveling direction of the vehicle V, the vehicle V tries to enter the diverging lane DL on the left side, so the controller 150 may transmit a control signal for operating the left turn signal lamp to the second control device 140.

Alternatively, in a situation in which the first intention is identified in Step 200 and the lane-related ADAS function is activated in Step 300, if the edge lane and the diverging lane DL are located on the right side with respect to the traveling direction of the vehicle V, the vehicle V tries to enter the left connection edge lane CL, so the controller 150 may transmit a control signal for operating the left turn signal lamp to the second control device 140. In addition, in a situation in which the first intention is identified in Step 200 and the lane-related ADAS function is activated in Step 300, if the edge lane and the diverging lane DL are located on the left side with respect to the traveling direction of the vehicle V, the vehicle V tries to enter the right connection edge lane CL, so the controller 150 may transmit a control signal for operating the right turn signal lamp to the second control device 140.

According to operation of Step 400, the above-described second problem of the prior art may be improved. That is, according to operation of Step 400, whether the vehicle V enters the connection edge lane CL or changes to the diverging lane DL may be notified to the following vehicle through the operation of the turn signal lamp, thereby reducing the risk of accident between the host vehicle V and the following vehicle.

The present disclosure configured as described above identifies the driver's intention in the vicinity of the target section if the vehicle V enters the vicinity of the target section, and controls to perform or not perform the function of the lane-related ADAS as necessary, thereby improving malfunctions occurring in lane-related ADAS. Further, the present disclosure may control the lane-related ADAS to perform or not perform the function according to the intention of the driver identified in the vicinity of the target section, and may control the turn signal lamp according to the control to operate together, thereby reducing the risk of an accident with a following vehicle.

Although the present disclosure has been described in detail with reference to specific embodiments, it is to be understood that various modifications are possible without departing from the scope of the present disclosure. Therefore, the scope of the present disclosure is not limited to the described embodiments, but should be defined by the following claims and equivalents thereto.

EXPLANATION OF REFERENCE NUMERALS

100 system
110 camera
120 first control device
130 alarm device
140 second control device
150 controller

What is claimed is:

1. A system comprising:
    a memory for storing an image captured by a camera of a vehicle; and
    a processor for controlling a lane-related Advanced Driver Assistance System (ADAS) in the vehicle using information stored in the memory,
    wherein the processor is configured to:
    identify a driver's intention in a rear region of a target section, which is a divergence point section without an indication line, using the image; and
    determine whether to perform the lane-related ADAS function in the target section according to the identified driver's intention.

2. The system of claim 1, wherein the lane-related ADAS comprises a Lane Keeping System (LKS) or a Lane Departure Warning System (LDWS).

3. The system of claim 1, wherein the processor is configured to:
    identify the driver's intention using a first change rate, which is a rate of change in a width of a driving lane in a rear region of a target section, and a second change rate, which is a rate of change in a distance of the vehicle to a lane located in an edge direction of the driving lane in the rear region of the target section, in a state where there is no operation of a turn signal lamp.

4. The system of claim 3, wherein the processor is configured to:
    identify the first and second rates of change using the images captured at different times in the rear region.

5. The system of claim 3, wherein the processor is configured to:
    identify that the driver's intention is a first intention to enter a connection edge lane, which is a lane connected to the driving lane, if the first and second change rates both increase.

6. The system of claim 5, wherein the processor is configured to:
    control the lane-related ADAS function to be activated based on the connection edge lane in the target section if the first intention is identified.

7. The system of claim 6, wherein the processor is configured to:
    control the vehicle to maintain the connection edge lane according to the activation or to generate a warning if the vehicle deviates from the connection edge lane.

8. The system of claim 6, wherein the processor is configured to:
    control the turn signal lamp for the direction of the connection edge lane to operate upon the activation.

9. The system of claim 3, wherein the processor is configured to:
    identify that the driver's intention is a second intention to enter a diverging lane branched from the driving lane if the first change rate increases and the second change rate decreases.

10. The system of claim 9, wherein the processor is configured to:
    control the lane-related ADAS function to be deactivated in the target section if the second intention is identified.

11. The system of claim 10, wherein the processor is configured to:
    control the turn signal lamp for the direction of the diverging lane to operate upon the deactivation.

12. A control method performed in a system of a vehicle for controlling a lane-related Advanced Driver Assistance System (ADAS) using an image captured by a camera of the vehicle, the control method comprising:
    identifying a driver's intention in a rear region of a target section, which is a divergence point section without an indication line, using the image; and determining and controlling whether to perform the lane-related ADAS function in the target section according to the identified driver's intention.

13. The control method of claim 12, wherein the identifying comprises:
identifying the driver's intention using a first change rate, which is a rate of change in a width of a driving lane in a rear region of a target section, and a second change rate, which is a rate of change in a distance of the vehicle to a lane located in an edge direction of the driving lane in the rear region of the target section, in a state where there is no operation of a turn signal lamp.

14. The control method of claim 13, wherein the identifying comprises:
identifying the first and second rates of change using the images captured at different times in the rear region.

15. The control method of claim 13, wherein the identifying comprises:
identifying that the driver's intention is a first intention to enter a connection edge lane, which is a lane connected to the driving lane, if the first and second change rates both increase, and
identifying that the driver's intention is a second intention to enter a diverging lane branched from the driving lane if the first change rate increases and the second change rate decreases.

16. The method of claim 15, wherein the controlling comprises:
controlling the lane-related ADAS function to be activated based on the connection edge lane in the target section if the first intention is identified.

17. The method of claim 16, wherein the controlling comprises:
controlling the vehicle to maintain the connection edge lane according to the activation or to generate a warning if the vehicle deviates from the connection edge lane.

18. The method of claim 15, wherein the controlling comprises:
controlling the lane-related ADAS function to be deactivated in the target section if the second intention is identified.

19. The method of claim 18, further comprising:
controlling the turn signal lamp for the direction of the diverging lane to operate upon the deactivation.

20. A vehicle comprising:
a camera for capturing an image of a front of the vehicle; and
a controller for performing control of a lane-related Advanced Driver Assistance System (ADAS) using the image,
wherein the controller is configured to:
identify a driver's intention in a rear region of a target section, which is a divergence point section without an indication line, using the image; and
determine whether to perform the lane-related ADAS function in the target section according to the identified driver's intention.

* * * * *